Figure 1:
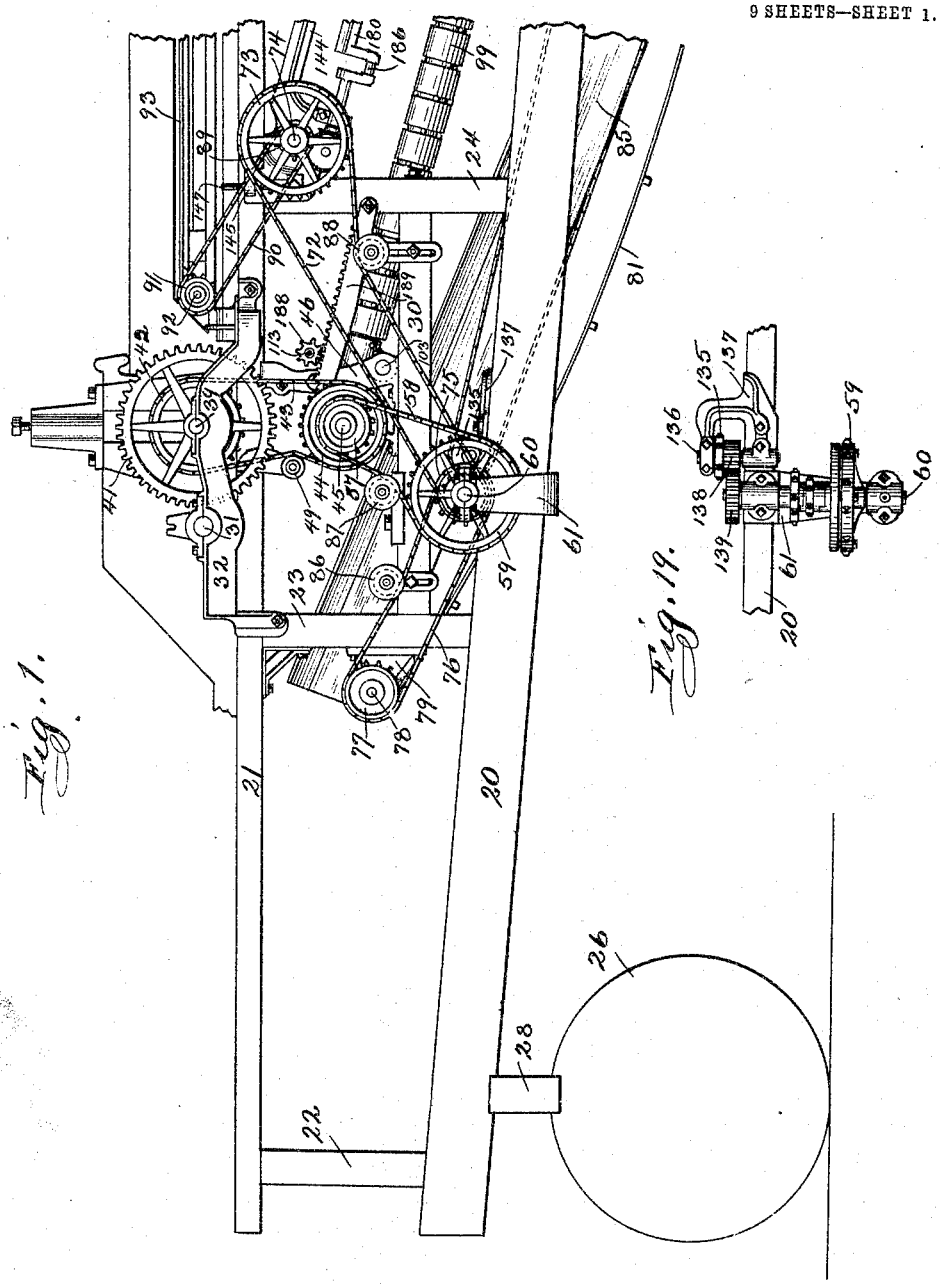

No. 788,831. PATENTED MAY 2, 1905.
L. HOLLAND-LETZ.
CORN HUSKER.
APPLICATION FILED JULY 1, 1902.

9 SHEETS—SHEET 4.

Witnesses
R. J. Jacker
L. Molton

Inventor:
Louis Holland-Letz
By Coburn, McRoberts & McElroy
Attys.

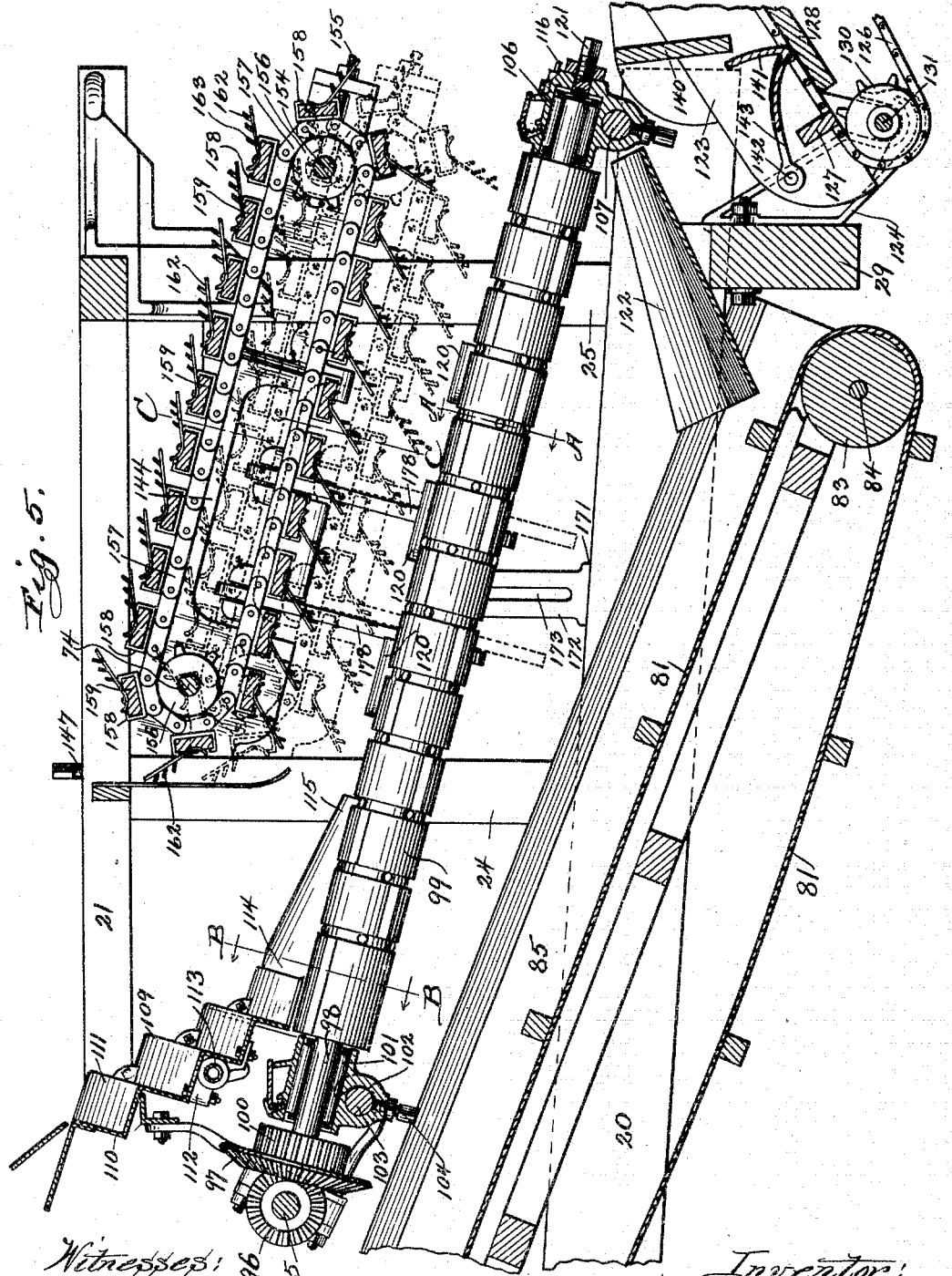

No. 788,831. PATENTED MAY 2, 1905.
L. HOLLAND-LETZ.
CORN HUSKER.
APPLICATION FILED JULY 1, 1902.
9 SHEETS—SHEET 6.
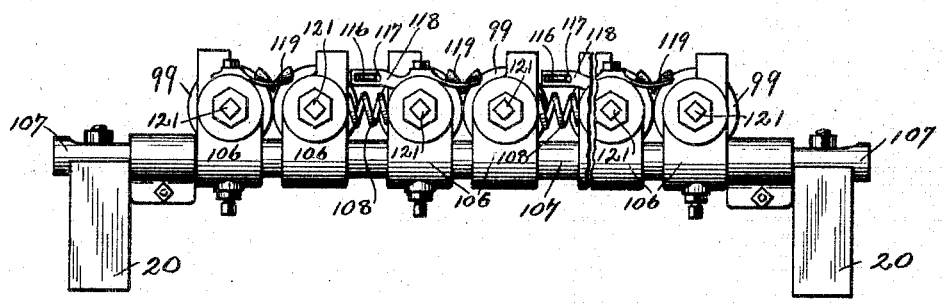
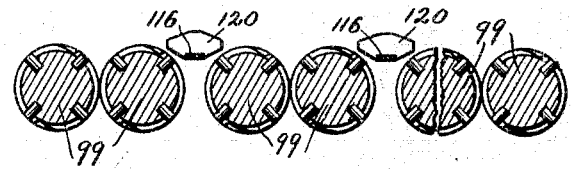
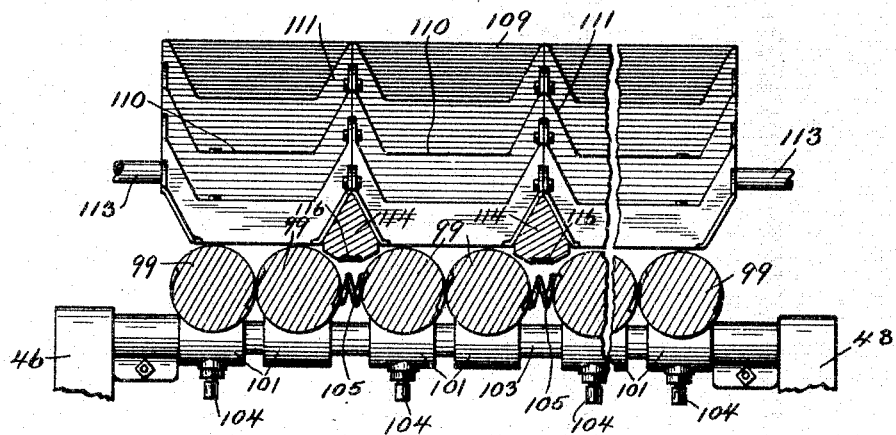

No. 788,831. PATENTED MAY 2, 1905.
L. HOLLAND-LETZ.
CORN HUSKER.
APPLICATION FILED JULY 1, 1902.

9 SHEETS—SHEET 7.

Witnesses:
R. J. Jaeker
L. Molitz

Inventor:
Louis Holland-Letz
By Coburn, McRobert & McElroy
Attys.

No. 788,831. PATENTED MAY 2, 1905.
L. HOLLAND-LETZ.
CORN HUSKER.
APPLICATION FILED JULY 1, 1902.
9 SHEETS—SHEET 8.
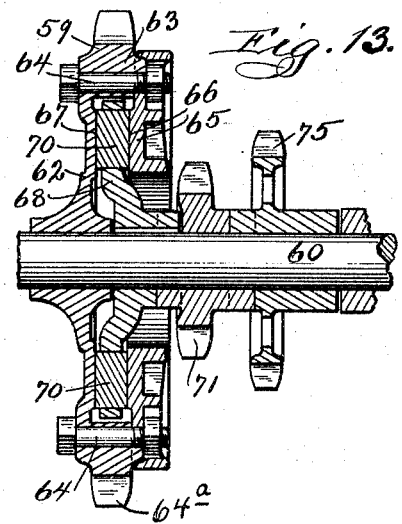
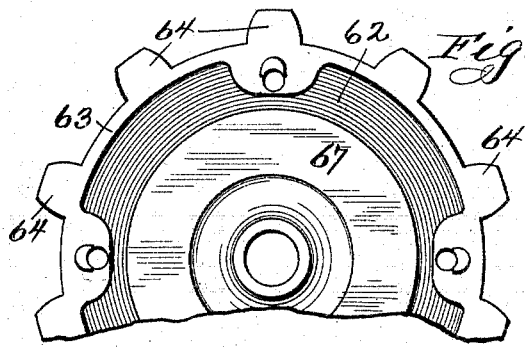
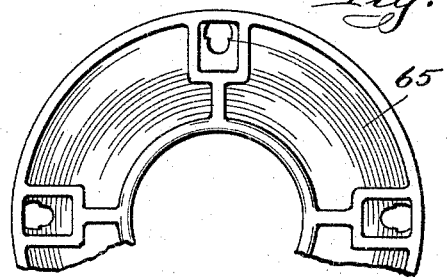
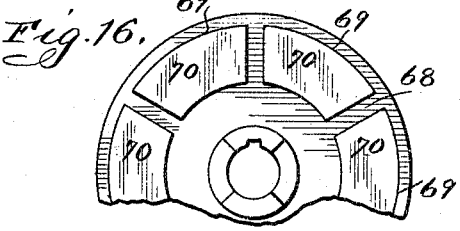
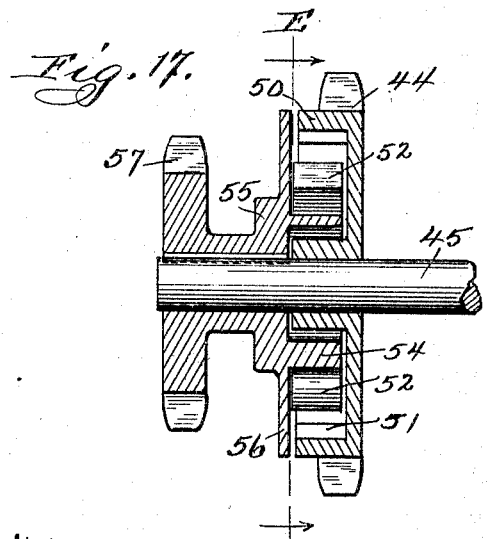
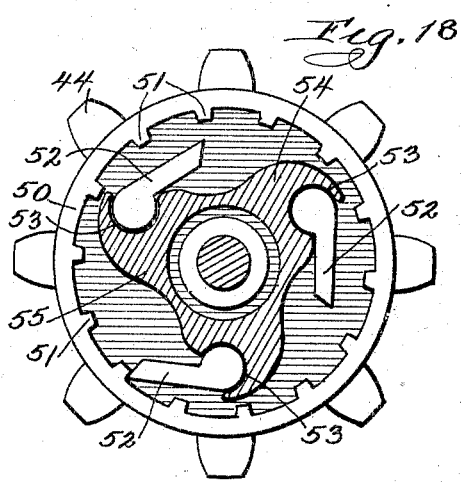
Witnesses:
R. J. Jaeker
L. Molitor
Inventor:
Louis Holland-Letz
By Coburn, McRobert & McElroy
Attys.

No. 788,831. PATENTED MAY 2, 1905.
L. HOLLAND-LETZ.
CORN HUSKER.
APPLICATION FILED JULY 1, 1902.
9 SHEETS—SHEET 9.
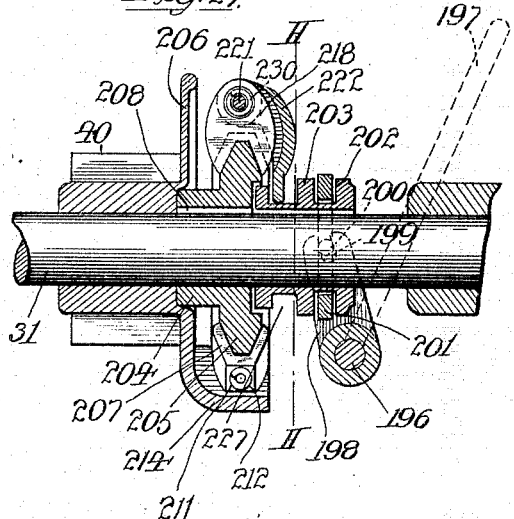
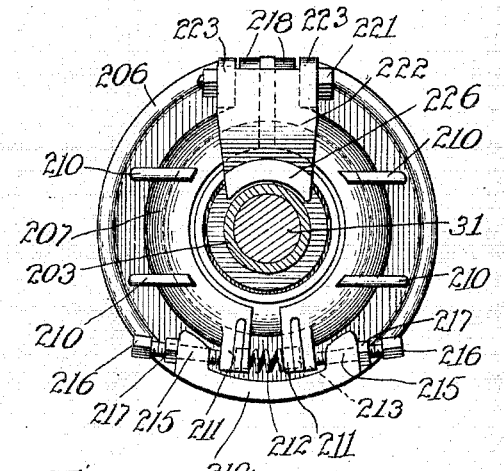
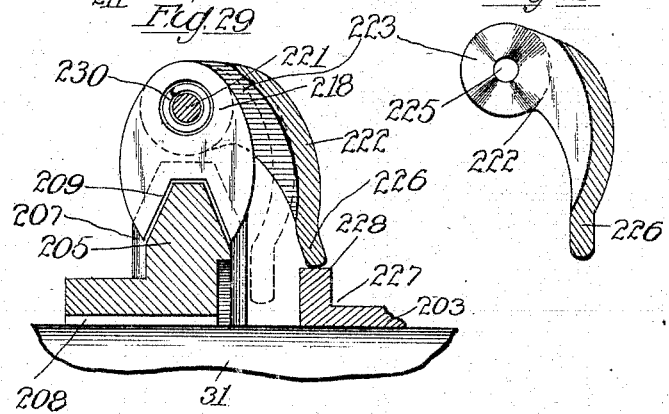
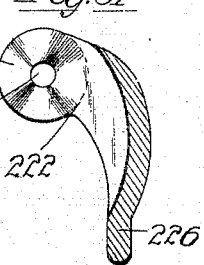
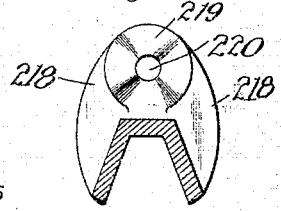
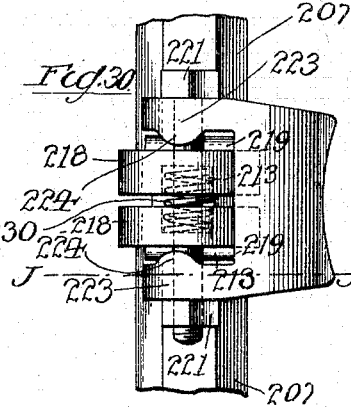
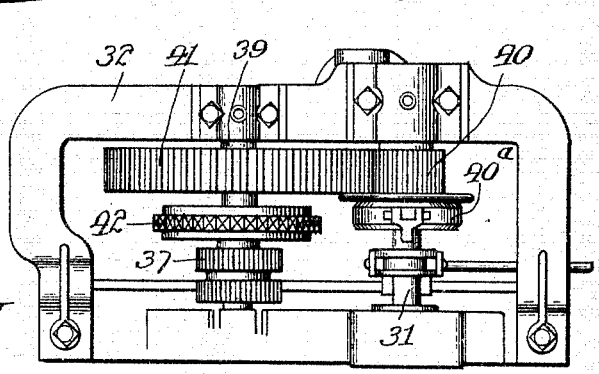
Witnesses:
Inventor:
Louis Holland Letz,
By John Howard McElroy
his atty.

No. 788,831. Patented May 2, 1905.

UNITED STATES PATENT OFFICE.

LOUIS HOLLAND-LETZ, OF CHICAGO, ILLINOIS, ASSIGNOR, BY MESNE ASSIGNMENTS, TO INTERNATIONAL HARVESTER COMPANY, OF CHICAGO, ILLINOIS, A CORPORATION OF NEW JERSEY.

CORN-HUSKER.

SPECIFICATION forming part of Letters Patent No. 788,831, dated May 2, 1905.

Application filed July 1, 1902. Serial No. 113,939.

*To all whom it may concern:*

Be it known that I, LOUIS HOLLAND-LETZ, a citizen of the United States, residing at Grand Crossing, Chicago, in the county of Cook and State of Illinois, have invented certain new and useful Improvements in Corn-Huskers, of which the following is a specification.

My invention is concerned with certain new and useful improvements in corn-huskers of the type shown in my Patent No. 641,293, dated January 16, 1900, and is designed to produce a machine of the class described which shall be simpler in its construction and more effective in its operation.

In the following specification I will first describe the construction and operation of the machine as a whole, and finally in the claims I will specifically point out the features of novelty which I claim as my invention.

To illustrate my invention, I annex hereto the drawings, in which the same reference characters are used to designate identical parts in all the figures, of which—

Figure 2:
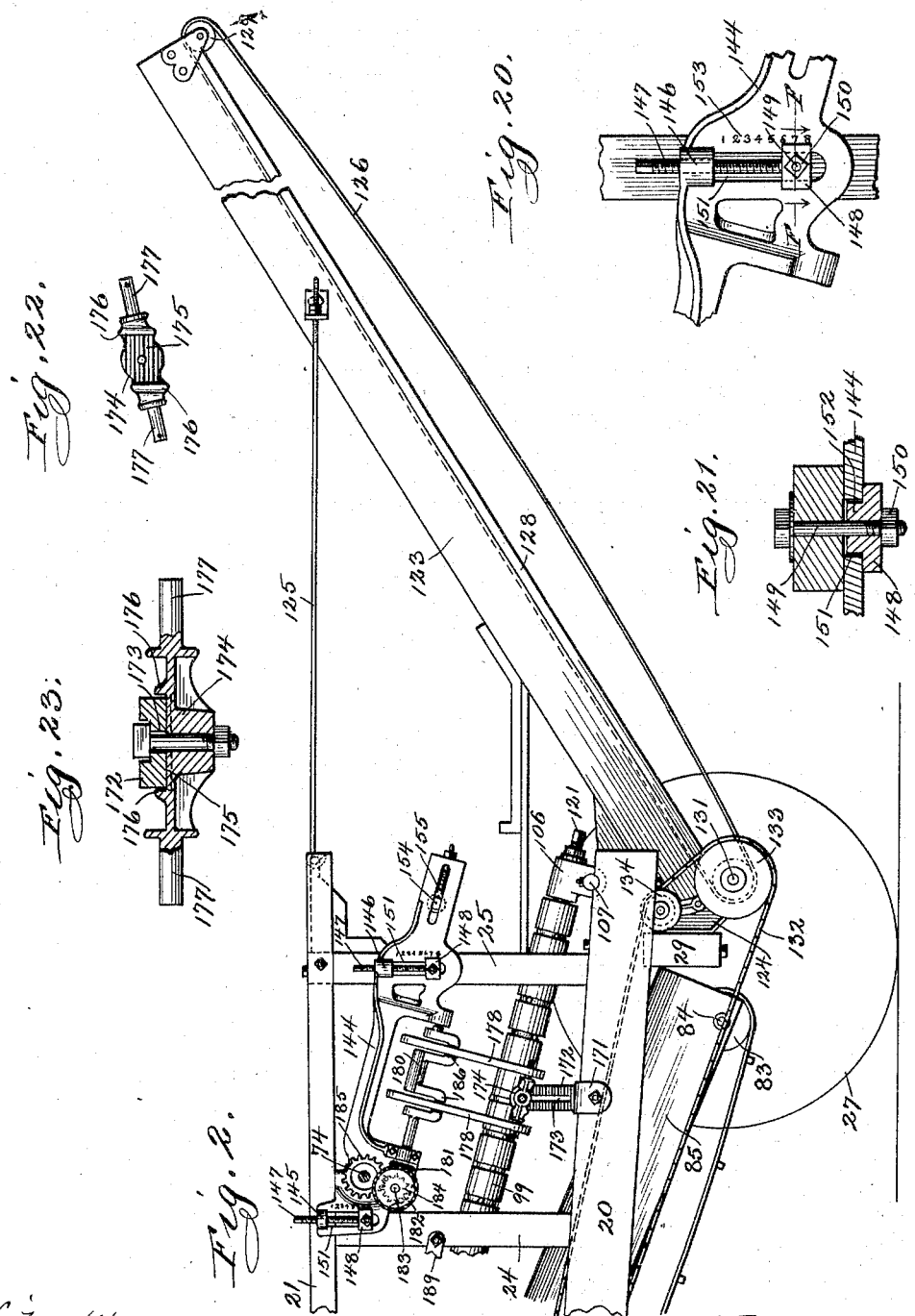
Figure 3:
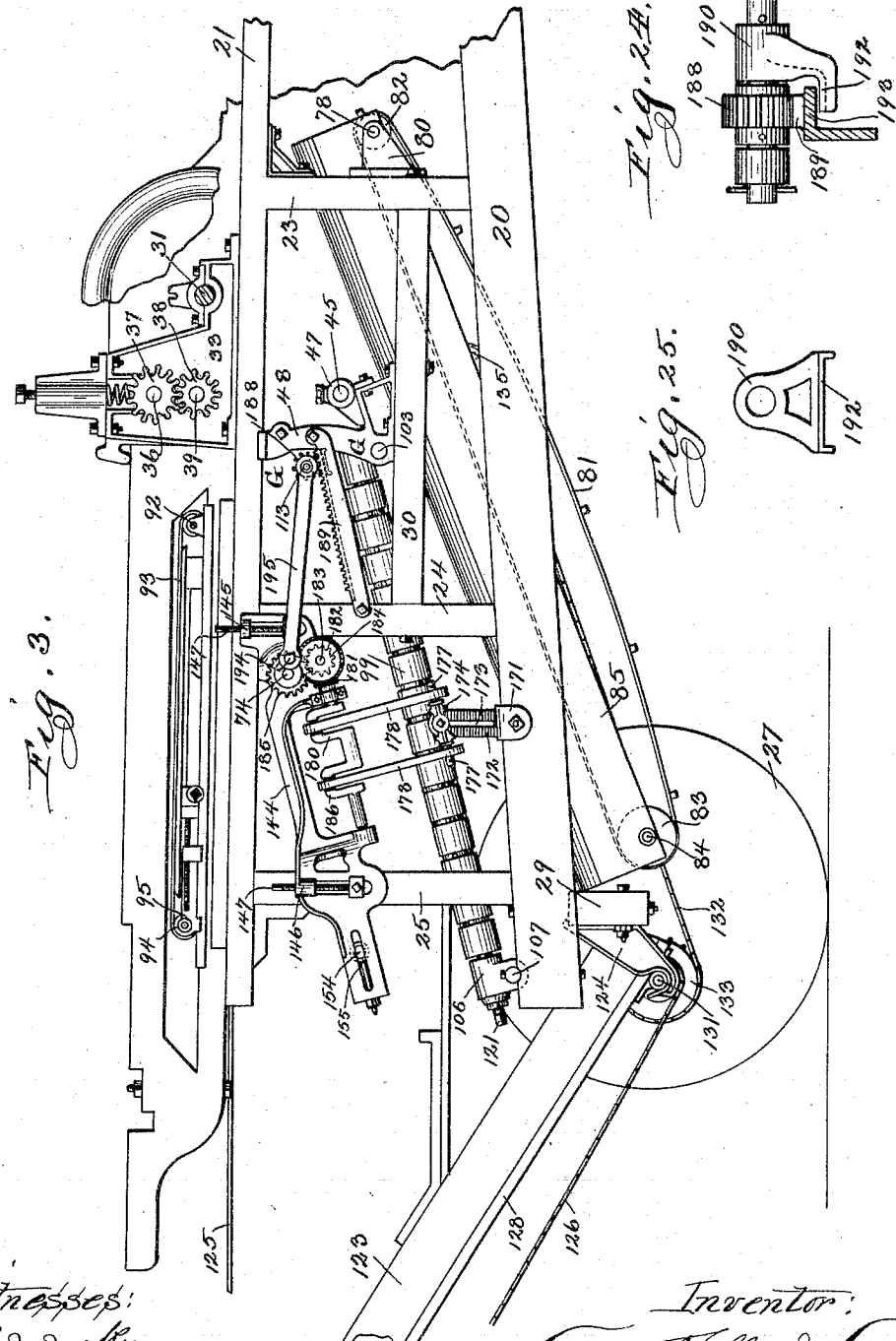
Figure 4:
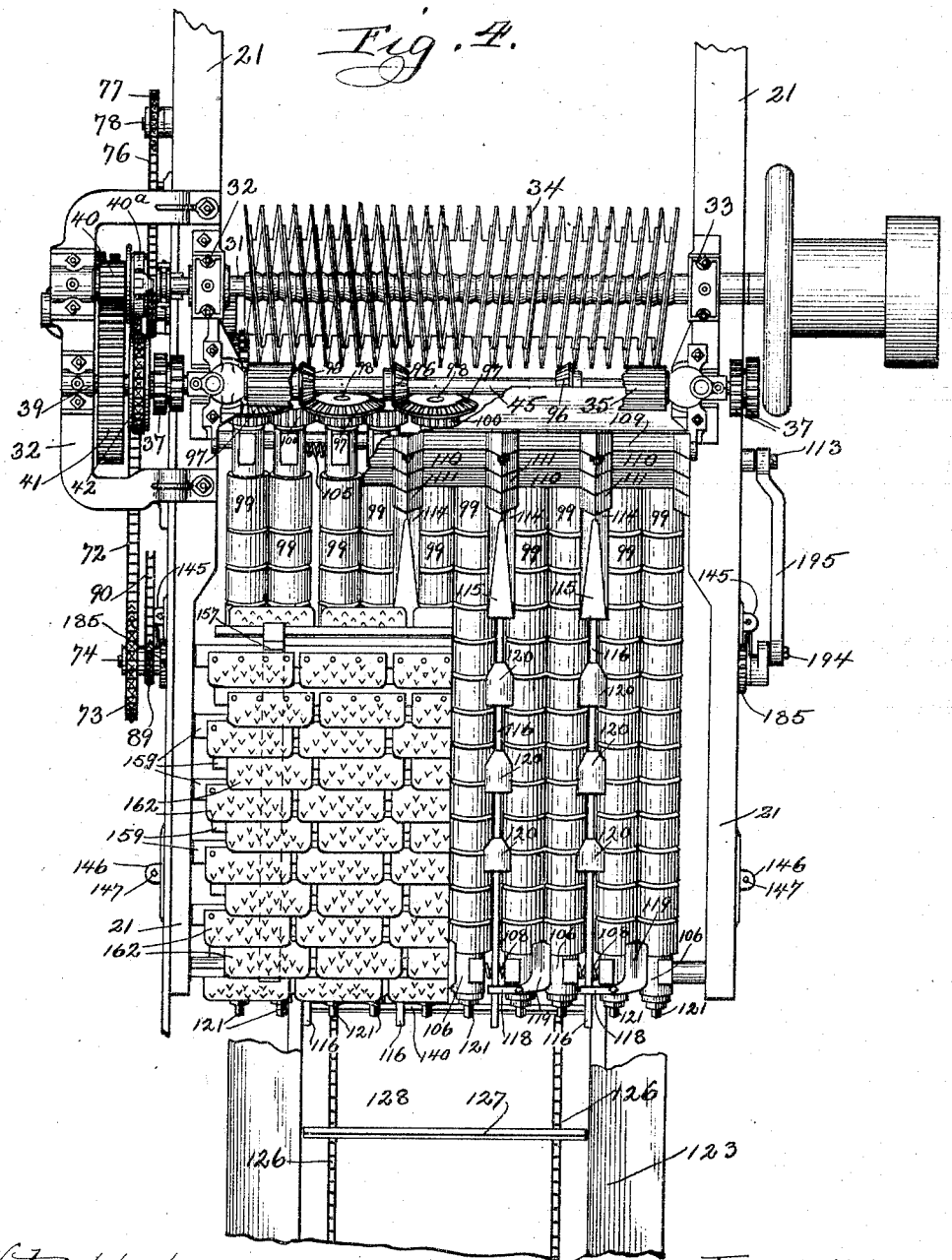
Figure 9:
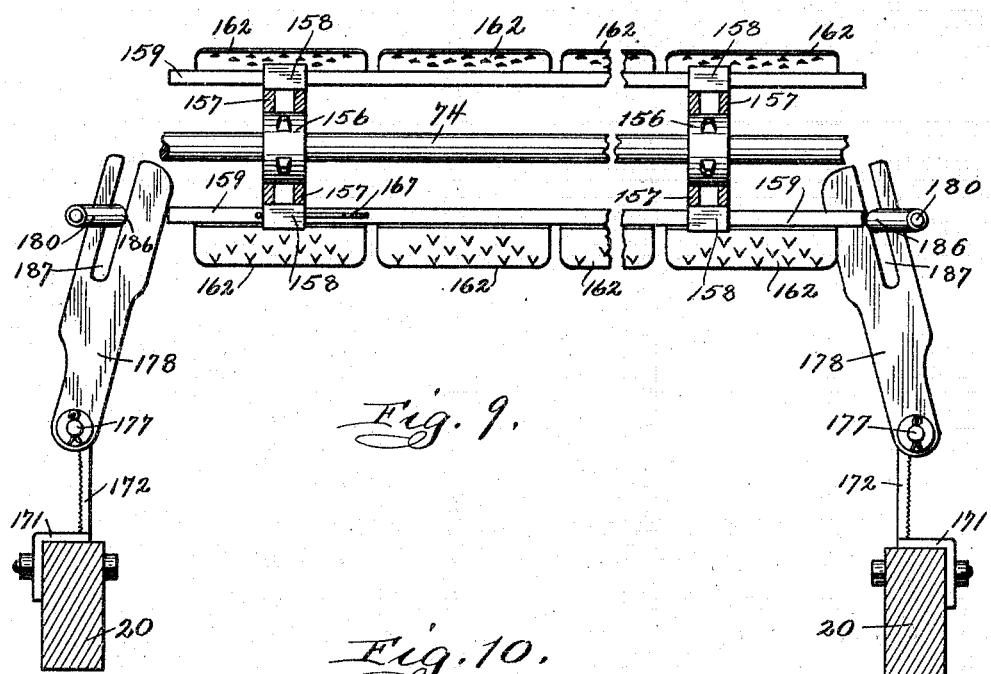
Figure 10:
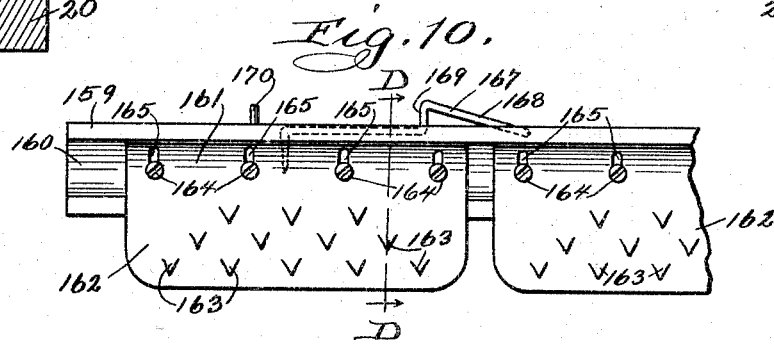
Figure 11:
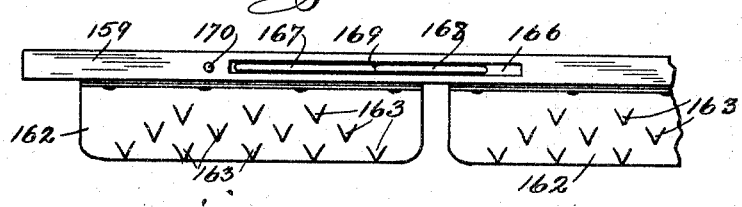
Figure 12:
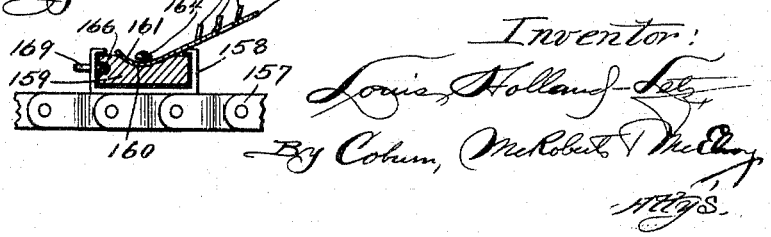

Figure 1 is an elevation of the forward end of one side of the machine containing my invention. Fig. 2 is a similar view of the rear end of the machine. Fig. 3 is a side elevation of the central portion of the machine seen from the other side and with some of the parts broken away. Fig. 4 is a top plan view of the husking mechanism proper, but with the husking-belt removed from one side of the machine and a portion of the reciprocating ear-feeding mechanism broken away. Fig. 5 is a central longitudinal section through the center of the machine on an enlarged scale. Fig. 6 is an end elevation of the lower end of the husking-rollers. Fig. 7 is a section through the husking-rollers on the line A A of Fig. 5. Fig. 8 is another sectional view through the rollers and the reciprocating ear-feeding mechanism in section on the line B B of Fig. 5. Fig. 9 is a vertical section through the husking-belt on the line C C of Fig. 5. Figs. 10 and 11 are a top plan view and a side elevation, respectively, of one end of one of the rasping-bars of the husker. Fig. 12 is a sectional view thereof on the line D D of Fig. 10. Fig. 13 is a central vertical section through a slip-clutch wheel, made of three parts, which I employ to prevent possible breakage. Fig. 14 is an elevation of the inner side of one of the outer parts of the clutch-wheel. Fig. 15 is a similar view of the other outer part. Fig. 16 is a similar view of the central part. Fig. 17 is a central section through a reverse clutch-wheel which I employ. Fig. 18 is a sectional view of the same on the line E E of Fig. 17. Fig. 19, Sheet 1, is a top plan view of the clutch-wheel shown in Figs. 13 to 16 with its associated parts. Fig. 20, Sheet 2, is an enlarged detail, in side elevation, showing an adjustment for the husking-belt. Fig. 21 is a sectional view on the line F F of Fig. 20. Fig. 22 is a detail of a bearing-casting. Fig. 23 is an enlarged view of the same and its associated parts in section. Fig. 24, Sheet 3, is an enlarged detail in section on the line G G of Fig. 3. Fig. 25 is an end elevation of the retaining-lug shown in Fig. 24. Fig. 26 is a view of a portion of the clutch mechanism as seen in Fig. 4, but on an enlarged scale. Fig. 27 is a central longitudinal section through the clutch shown in Fig. 26, but on an enlarged scale. Fig. 28 is an elevation thereof in section on the line H H of Fig. 27. Fig. 29 is a detail view of a portion of the mechanism shown in Fig. 27, but on a larger scale and with the clutch in its operative position. Fig. 30 is a plan view of the mechanism shown in Fig. 29. Fig. 31 is a central section through the cam-dog; and Fig 32 is a section through one of the clamping-jaws on the line J J of Fig. 30, illustrating the cam-lugs coöperating with the cam-dog.

In building up the framework for the complete machine I employ on each side the inclined bottom beam 20 and the horizontal upper beam 21, the beams being connected by the posts or struts 22, 23, 24, and 25, separated the distances shown. Above the front and rear wheels 26 and 27 and beneath the beam 20 I place the cross-pieces 28 and 29. The central posts 23 and 24 are likewise connected by the additional horizontal beams 30. Upon the skeleton thus formed the various parts of the machine to be described are supported.

The power is applied to the shaft 31 by means of the customary belt-wheel. (Seen in Fig. 4.) This shaft is mounted in suitable bearings in the generally rectangular bracket 32, secured on the right-hand side of the machine, and the corresponding bracket 33, secured on the left-hand side of the machine, both being mounted on the longitudinal top sills 21. This shaft carries the shredder-head 34, which may be of any desired construction, and coöperates with the customary pair of snapping-rolls 35, mounted in the customary manner in bearings in the brackets 32 and 33. The uppermost snapping-roll is secured on the shaft 36, which is driven by means of the gear-pinion 37, secured thereto, meshing with the gear-pinion 38, secured to the shaft 39 of the lower snapping-roll, which is driven by means of the gear-pinion 40 on the shaft 31, meshing with the gear-wheel 41, secured on the shaft 39 inside of the bracket 32, as clearly shown in Figs. 1 and 4. A friction-clutch $40^a$ is interposed between shaft 31 and the gear thereon, which can be thrown in or out of operation to control the stopping of the shaft 39 and mechanism driven thereby independently of the shaft 31. Secured on the shaft 39 is the sprocket-wheel 42, which through the sprocket-chain 43 drives the sprocket-wheel 44, which is secured on the transverse shaft 45, extending across the machine and mounted at the right-hand end in a bearing formed in or secured to the bracket 46. The left-hand end of the shaft is mounted in the bearing 47, secured upon the bracket 48, the brackets 46 and 48 being secured to and extending between the sills 30 and 21. A chain-tightener 49 is secured to the sill 21 in proper position to coöperate with the chain 43 in the customary manner.

The sprocket-wheel 44 is loosely mounted on the shaft 45 and is arranged to rotate therewith in one direction by the interposition of a reverse clutch mechanism, the details of which are shown in Figs. 17 and 18, where it will be seen that the sprocket-wheel 44 consists of the cup-shaped disk having the peripheral flange 50 formed with the teeth 51 on the inner surface thereof in position to be engaged by one or more of the plurality of gravity-pawls 52, which are mounted to swing in the sockets 53, formed in the body 54 of the other clutch member 55, which is splined on the shaft 45 and preferably has the disk 56 closing the open side of the cup-shaped disk constituting the body of the sprocket-wheel 44. A sprocket-wheel 57 is rigidly secured upon the shaft 45 and is preferably made integral with the clutch member 55. From the foregoing description of the clutch mechanism it will be apparent that as the shaft 39 rotates in one direction the shaft 45 will be compelled to rotate therewith, but will not rotate with it if the direction of the shaft 39 is reversed. This reverse clutch mechanism is employed to prevent any possibility of driving the husking mechanism in the wrong direction by any accident and breaking the machinery.

The sprocket-wheel 57, through the sprocket-chain 58, drives the sprocket-wheel 59, which is provided with the slip-clutch connections with the short counter-shaft 60, which is mounted in suitable bearings in a bracket 61, secured to the sill 20, on the right-hand side of the machine. This wheel 59 consists of the outer disk 62, which is loosely mounted on the shaft 60, and is substantially cup-shaped, being provided with the inwardly-projecting flange 63, upon the periphery of which are formed the sprocket-teeth $64^a$. Secured to the inner edge of the flange 63 by the bolts 64 is the annular disk 65, which is shown in Fig. 15, and is provided on its face adjacent to the disk 62 with the annular clamping-surface 66, directly opposite a similar annular clamping-surface 67, formed on the inner face of the disk 62. Splined upon the shaft 60, between the disks 62 and 65 and with its hub extending into the open center of the annular disk 65, is the disk 68, which has formed therein the segmental recesses 69, which are at the same radial distance from the center as the clamping-surfaces 66 and 67. These recesses 69 are filled by the correspondingly-shaped blocks 70, which are preferably formed of hardwood and are tightly clamped by means of the bolts 64 between the disks 62 and 65, so that the shaft 60 is compelled to move with the sprocket-wheel 59 under normal conditions. The friction between the clamping-surfaces 66 and 67 and the blocks 70 is so adjusted that if the resistance to the movement of the shaft 60 should become so great as to cause the possible breakage of the machinery the blocks 70 will slip between the clamping-surfaces 66 and 67, and thus permit the wheel 59 to rotate independently of the shaft 60.

Rigidly secured upon the shaft 60 is a small sprocket-wheel 71, which by means of the sprocket-chain 72 drives the large sprocket-wheel 73, secured upon the right end of the shaft 74, journaled in suitable bearings, to be more fully described hereinafter, and which drives the husking-belt, also to be hereinafter referred to. Another sprocket-wheel 75 is rigidly secured upon the counter-shaft 60 and by means of the chain 76 drives the sprocket-wheel 77, secured on the end of the shaft 78, journaled in the bearings 79 and 80, secured upon the standards 23, and serve to drive the husk-carrying belt 81, extending about the roller 82, secured to the shaft 78, and the roller 83, secured to the shaft 84, mounted to rotate in bearings formed in the lower end of the side boards 85 near the bolster 29. This belt serves to carry the husks that are stripped off of the ears of corn by the husking-rollers upward to a point beneath the shredder, where the shredded stalks are added to them, and both are carried over the end of the chute formed between the side boards and the belts and delivered to the cleaning mechanism, (not shown,) which is located in the front of the machine between the standards 22 and 23. Suitable chain-tightener wheels 86, 87, and 88 are adjustably supported upon the short sill 30 in proper position to coöperate with the chains 76, 58, and 72, respectively.

The shaft 74 has secured thereon adjacent to the wheel 73 the small sprocket-wheel 89, which by means of the sprocket-chain 90 drives the small sprocket-wheel 91, secured on the end of the shaft 92, mounted in suitable bearings, and which drives the feed-belt 93, which passes around the roller 94, journaled in the adjustable bearings 95 near the rear end of the machine. The fodder to be shredded is placed butts forward on the feed-belt 93, which is located in the proper position to carry the stalks between the snapping-rolls 35, which snap off the ears in the customary manner and present the stalks to the shredder-head 34, which reduces them to shreds in the customary manner. The shaft 45 has secured thereon at suitable intervals the bevel-gear pinions 96, which mesh with the bevel-gear pinions 97, secured on the ends of the alternate shafts 98, which carry the husking-rollers 99. All of the husking-rollers have secured at their upper ends the gear-pinions 100, the gear-pinions of the adjacent pairs of rollers intermeshing, so that they run together in the customary manner. The shafts 98 are mounted at their upper ends in the roller-bearing boxes 101, which are provided on their under sides with the transverse bearing-apertures 102, by which they are threaded on the bearing rod or shaft 103, (best shown in Fig. 8,) which extends across the machine and is supported at its ends in the brackets 46 and 48. Set-screws 104, screwed through the bottom of the alternate bearings 101 against the rod 103, serve to hold the upper ends of the rollers having the beveled gear-wheels 97 secured thereon in the proper position to mesh with the bevel-gear pinions 96. The alternate bearings are loose upon the rod 103; but the rollers 99 which they carry are pressed yieldingly into engagement with their companion husking-rollers by expanding helically-coiled springs 105, interposed between the outer side of the free bearing of one pair of rollers and the outer side of the fixed bearing of the adjacent pair of rollers. The husking-rollers 99 are supported at their lower ends in similar bearings 106, mounted in a similar manner upon the bearing-rod 107, secured upon the upper surfaces of the lower ends of the sills 20 and have the corresponding helically-coiled expanding-springs 108 interposed between the pairs of rollers in the same manner and for the same purpose. The husking-rollers 99 are of any desired construction, having their surfaces roughened in some manner, so as to catch the husks that have been loosened by the husking-belt, to be described, and pull the husks between the rollers and tear them off of the ears of corn without any possibility of the ears being drawn through the rollers.

To provide for the proper feed of the snapped ears to the husking-rollers and to prevent any possibility of their being clogged by any foreign matter, I provide the reciprocating feeding mechanism best shown in Figs. 4 to 8. This feeding mechanism consists of a stepped reciprocating plate (designated as a whole by the reference character 109) consisting of the reduced portions 110, covering the tops of each coöperating pair of rollers, and angular portions 111, covering the space between the ends of each set of rollers, the general effect being to throw the ears of corn which may light on this stepped plate between the sets of rollers which are rotating toward each other, so as to carry the ear down between these rollers, so that the husks will be surely seized thereby. This plate 109 may be built up of cast sections united by bolts and all united by the castings 112, bolted to the under side thereof to the rod 113, extending across the machine and by which the feeding mechanism is reciprocated by the means to be described. At the bottom of each of the angular portions 111 I secure the pushing-blocks 114, which at the point where they are secured are of the shape shown in cross-section in Fig. 8, but which have the lower ends flattened off, as seen at 115 in Fig. 4. Secured to the under side of the blocks 114 are the bars 116, which extend the entire length of the rollers between the separate pairs and have their lower ends reciprocating in the recesses 117, formed in the brackets 118, bolted onto the tops of the lower bearings 106 and also containing the plates 119, extending rearwardly and upwardly between the ends of the coöperating rollers to prevent the ears of the corn from dropping between the bearings, which are reduced at this point. The blocks 114 have the function of pushing in the ears that might accidentally get between the non-coöperating adjacent rollers over between the coöperating rollers, and the additional blocks 120, placed at intervals along the bars 116, have the same function. This reciprocating feeding mechanism, and especially the extension thereof formed by the bars 116 and the blocks 120, is of great value and importance in a husker of the type of mine, which employs the husking-belt, inasmuch as the husking-belt, owing to the transverse motion of the slats thereof, to be described, has a tendency to sometimes throw the ears of corn from their proper position between the coöperating rollers. The lower ends of the shafts 98 of the husking-rollers rest against the adjustable set-screw 121, which can be screwed into the bottom of the bearing to adjust with great nicety the position of the rollers. A hopper-plate 122 extends from beneath the bottom of the ends of the husking-rollers downwardly and forwardly over the belt 81, so as to insure the ultimate falling thereon of all the husks and shelled corn that may be carried between the husking-rollers. The ears of corn after they are husked fall from the end of the rollers onto the conveyer 123, which consists of the customary trough mounted on the brackets 124, secured on the bolster 29 and having its upper portion supported by the guy-rods 125, extending to the end of the sill 21. This trough has mounted therein the carrying-chains 126, connected by the slats 127, which coöperate with the bottom 128 of the trough to carry the corn to the top of the conveyer and deliver it to a wagon or crib, as the case may be. The chains 126 travel over the customary wheels 129 at the top of the conveyer and are driven by the sprocket-wheels 130, secured upon the shaft 131, mounted in suitable bearings formed on the carrier 123 and driven by the chain or belt 132, coöperating with the wheel 133, secured on the ends of the shaft 131. The chain or belt 132 passes over the idle pinion 134 and is driven by the sprocket-wheel 135, (see Fig. 19,) secured on the short counter-shaft 136, mounted in suitable bearings on a bracket 137, secured to the sill 20, adjacent to the bracket 61. The shaft 136 has secured thereto the gear-pinion 138, which meshes with the gear-wheel 139, secured to the inner end of the counter-shaft 60. To prevent any possibility of the ears of corn escaping from the bottom of the conveyer, I provide the cross-piece 140, extending between the sides of the conveyer just beneath the ends of the husking-rollers, as shown in Fig. 5, and extending down as nearly to the slats 127 as is possible without interfering therewith. To close the space between the bottom of the plate 140 and the carrying-chains, I provide the swinging valve-piece 141, which extends across the inside of the conveyer and is pivoted thereto, as at 142, by the arms 143 on the ends thereof. The operation of this device will be apparent, as it normally closes the space between the bottom of the cross-piece 140 and the conveyer and is swung up by the slats 127 to permit their passage.

The husking-belt mechanism is mounted in two castings 144, which are vertically adjustably secured on the posts 24 and 25 by the mechanism best shown in Figs. 20 and 21. As seen in Fig. 5, the husking-belt is capable of a considerable vertical adjustment to bring it nearer to and farther from the husking-rolls, as is necessary in operating on different-sized ears. The casings 144 are provided with the screw-threaded lugs 145 and 146, through which pass the adjusting-screws 147, having the squared heads by which they can be turned to raise or lower the castings, and consequently the husking-belt. The lower ends of these screws rest upon the blocks 148, which, together with the bolt 149 and nut 150 and the elongated slots 151 in the casting 144, into which the reduced portions 152 of the blocks 148 pass, serve to securely clamp the brackets 144 in any desired vertical position of adjustment. As best seen in Fig. 20, I preferably provide a series of graduations 153 on the brackets adjacent the slots 151 and which read in connection with the blocks 148 as pointers serve to indicate the distance from the husking-rollers at which the husking-belt is adjusted and whether it is an equal distance from the rollers at both ends. The shaft 74, which is journaled in suitable stationary bearings in the casting 144, and the shaft 154 at the lower end of the husking-belt, which, however, is journaled in the adjustable bearings 155 shown, are each provided near their ends with the sprocket-wheels 156, about which pass the sprocket-chains 157, which, as best shown in Fig. 12, are provided with the rectangular clips 158, secured, say, to every alternate link. These clips 158 are open at their tops and have mounted to slide therein the rasping-bars 159, the upper surfaces of which are preferably channeled out on a curve, as shown at 160, to receive the correspondingly-curved edges 161 of the rasps 162, which, as clearly seen in Figs. 10 to 12, are metallic blades having the points 163 punched out of the body thereof. The rasps are loosely secured on the bars 159 by means of the screws 164, passed through the slightly-elongated recesses 165 in the rasps and screwed into the bars 159. The object of this construction is to give the rasps a certain amount of movement independently of the bars, so that they can coöperate more effectually with the husks on the ears of corn as they are reciprocated across them by the mechanism to be hereinafter described. To readily assemble the rasping-bars and hold them in place, I provide the groove 166 in one edge thereof, in which is mounted the spring-detent 167, having the shape clearly shown in Fig. 10 with the incline 168 and the stop-shoulder 169. Opposite the stop-shoulder 169 I secure the stop-pin 170, and when the bars are to be assembled the bar 159 is shoved from the other end into the adjacent clip 158 and through that until its other end passes into the other clip, and when the bars are positioned the nearest clip 158 is between the shoulder 169 and the pin 170. When it is desired to remove them, the detent 169 can be pressed in and the bar removed. The distance between the shoulder 169 and the pin 170 is equal to the width of the clip 158 plus the amount of longitudinal movement that is given to the bar 159 by the mechanism now to be described.

Secured upon the sills 20 between the posts 24 and 25 are the castings 171, which have the horizontally-corrugated vertical extensions 172, provided with the slot 173. A casting 174 (see Figs. 22 and 23) is adapted to be clamped to the extension 172 and is provided on its back with the corrugations 175, coöperating with the corrugations on the extension 172 and the shoulders 176, which embrace the sides of the extension 172, as best shown in Fig. 23. Formed upon the ends of the casting are the bearing-pins 177, upon which are pivotally mounted the levers 178, (best shown in Fig. 9,) which are so situated as to alternately engage the ends of the rasping-bars 159 and slide them back and forth as they pass downward over the ears of corn, thus causing the rasping-surfaces to take hold of and loosen the husks on the ears, so that they will be gripped by the rollers and stripped off. To vibrate these levers 178, I provide the crank-shafts 180, which are journaled in suitable bearings formed in the bottoms of the castings 144 and are rotated by the bevel gear-pinions 181, secured on the upper ends thereof, meshing with the bevel gear-wheels 182, mounted to rotate on the bearing-pintles 183, projecting outwardly from the casting 144. Rigidly secured on the inner face of the bevel gear-wheels 182 are the gear-pinions 184, (shown in dotted lines in Figs. 2 and 3,) which mesh with the gear-wheels 185, secured at or near the ends of the shaft 74, so that in this manner the power is supplied for vibrating the arms 178 through the medium of the crank portions 186 of the crank-shaft 180, which take into the slots 187, formed in the levers 178.

To reciprocate the force-feed apparatus 109, I employ the mechanism best shown in Figs. 1, 3, and 24, where it will be seen that the rod 113, extending transversely of the machine and secured to the under side of the force-feed mechanism, has secured on its outer ends the gear-pinions 188, which mesh with the rack-bars 189, secured between the post 24 and the brackets 46 and 48 on the two sides of the machine. To hold the pinions 188 in mesh with the rack-bars 189, I fasten to the shaft 113 the collars 190, (shown in Fig. 25,) which are provided with the outwardly-projecting flanges 192 on their under sides, taking under the flanges 193, projecting from the sides of the rack-bar 189, so as to hold the parts in mesh. On the other side of the machine from which the gear-wheel 73 is applied to the shaft 74 I secure to the end of said shaft a crank-pin 194, which is pivoted upon one end of the connecting-link 195, the other end of which is pivoted on the shaft 113, so that the rotation of the shaft 74 imparts the desired right-line reciprocating movement to the force-feed apparatus and causes the two ends to be moved in unison without any possibility of lost motion, although the driving-power is applied to only one end.

In Figs. 26 to 32 I have illustrated in greater detail the clutch mechanism 40ª. It is applied to the shredder-head shaft 31 and is interposed between it and a gear-pinion 40. Mounted in suitable bearings and extending beneath the left-hand end of the shaft 31 is a rock-shaft 196, having a handle 197 at its outer end, by which the shaft is rocked and the clutch is operated. The inner end of the shaft 196 has secured thereon the yoke 198, having the recesses 199 in the upper ends of the forks coöperating with the pins 200, projecting from the periphery of a collar 201, placed in the annular groove 202, formed in the sleeve 203, which is free to slide a short distance on the shaft 31 and which may or may not be splined thereto to rotate therewith. It will be apparent that the inwardly-projecting pins might be secured to the ends of the forks and coöperate directly with the annular groove 202, although I prefer the construction shown. The gear-pinion 40 is loosely mounted on the shaft 31 immediately adjacent the hub 204 of the friction-disk 205, the pinion 40 being preferably provided with the annular flange 206, extending between the teeth of the pinion and the friction-disk 205 and its associated clamping members 207. The friction-disk 205, as clearly shown in Figs. 27 and 29, preferably has the outer portions of its sides beveled off, as shown, and is secured to the shaft by the spline 208. The clamping members 207, which are two in number, are half-rings having their inner peripheries 209 shaped to correspond to the beveled outer edges and periphery of the friction-disk 205. The outer surfaces of these half-rings 207 may be of the same general outline as the inner surfaces, and as they are quite thin are preferably strengthened by the flanges or ribs 210, formed thereon, as seen in Fig. 28. At their lower ends they are provided with the ears 211, between which is introduced the short helically-coiled expanding spring 212, which preferably has its ends seated in the recesses 213, formed in the opposing faces of the ears 211. Beneath these ears I extend a horizontal portion 214 of the flanged disk 206, this horizontal flanged portion being provided with the inwardly-projecting ears 215, in which are mounted set-screws 216, which have their inner ends bearing against the outer faces of the ears 211 to regulate the amount of friction that shall be applied to the disk and to take up any wear. Lock-nuts 217 on these screws 216, coöperating with the lugs 215, serve to secure the screws in any desired position of adjustment. The upper ends of the clamping half-rings 207 are provided with the ears 218, the inner face of which is seen in Fig. 29 and the outer face of which is seen in Fig. 32. The inner faces are plain, while the outer faces have formed thereon the diametrically opposite cam-lugs 219, concentric with the aperture 220, through which a bolt 221 passes to hold the clamping-dog 222 thereon. The clamping-dog 222 consists of the curved plate constituting the body thereof and which has projecting inwardly from the sides of its upper end the ears 223, which are provided with the oppositely-disposed cam-lugs 224, which are so placed that in the inoperative position of the clutch the lugs 224 fit into the recesses between the lugs 219 on the ears 39 of the half-ring clamping members 28. The ears 223 are of course provided with the concentric apertures 225, through which the bolt 221 passes. The tail 226 of the clamping-dog in its inoperative position, as shown in full lines in Fig. 27 and in dotted lines in Fig. 29, hangs within the annular groove 227, formed in the collar 203; but when the shaft 196 is rocked into position to throw the clutch into operation the collar 203 is slid along until the clamping-dog 222 is swung outward and upward by the flange 228 on the collar 203, constituting its inner end and the boundary of the channel 227. In its operative position, as shown in Fig. 29, the tail 226 of the cam-dog rests on the periphery of the flange 228, securely locking the parts in their operative position. As above described, the inner faces of the ears 218 are plain except for the recesses 229, surrounding the apertures 220 and in which the ends of the helically-coiled expanding spring 230 rest. The operation of this clutch will be readily apparent. When the parts are in the inoperative position shown in Fig. 27, the cam-lugs 224 on the ears 223 rest in the depressions between the cam-lugs 219 on the ears 218, and the action of the springs 212 and 230 is to hold the half-rings supported so that they do not bear upon the friction-disk 26. When, however, the parts are swung to the operative position shown in Fig. 29, the lugs 224, contacting with the lugs 219, force the ears 218 inward toward each other until the inner faces of the half-rings 217 are brought into frictional contact with the outer edges and periphery of the friction-disk 205, compelling the pinion 40 to rotate with the shaft 31. When the parts remain in this position, the friction-clutch is locked in position by reason of the tail 226 of the cam-dog 222 resting on the cam 228. When it is desired to release the clutch, the shaft 196 is rocked in the opposite direction, and the flange 228 being carried from beneath the tail 226 of the dog 222 the action of the springs 212 and 230 will be to separate the half-rings 207, and the action of the cam-lugs 219 on the cam-lugs 224 will be to swing the cam-dog 222 to its normal inoperative position. When it is desired to increase the amount of friction or to take up any wear, the set-screws 216 are adjusted as much as may be necessary for this purpose.

The clutch mechanism 40ª is located between the shredder-head and the snapping-rolls, so that if the latter should become clogged up they can be stopped, while the shredder-head and fan (not shown, but which I employ to carry off the shredded fodder in the customary manner) continue their rotation, so that the clogged material is shredded from between the rollers and all carried from the machine before the rollers are started again. The one-way clutch is used in the location described in order that the machine may be reversed to clear out the snapping-rolls if they should become so clogged that the material cannot be shredded out without running the husking-rolls, husk-conveyer, corn-conveyer, and cleaning apparatus, all of which if run backward would be broken. The slip-clutch is located in the position described to prevent any possible breakage of the machinery if the husked-corn conveyer, fodder-conveyer, and husking or feed belts should become clogged. By the system of clutches above described the machine is made capable of taking care of all possible contingencies that may arise in the operation thereof, thus increasing the durability, utility, and capacity of the machine.

While I have herein shown and described the various features of my invention as embodied in the forms which I at present consider best adapted to carry out its purposes, it will be understood that they are capable of modifications and that I do not desire to be limited in the interpretation of the following claims except as may be necessitated by the state of the prior art.

What I claim as new, and desire to secure by Letters Patent of the United States, is—

1. In a device of the class described, the combination with the snapping-rolls, a shaft for driving same, and a friction-clutch interposed between said driving-shaft and snapping-rolls; of corn-husking mechanism coöperating with said snapping-rolls and driven thereby, and a reverse release-clutch interposed between the snapping-rolls and the corn-husking mechanism.

2. In a device of the class described, the combination with the snapping-rolls, a shaft for driving the same, and a friction-clutch interposed between said driving-shaft and snapping-rolls; of corn-husking rollers suitably located to coöperate with said snapping-rolls and driven thereby, and a reverse release-clutch interposed between the snapping-rolls and the husking-rollers; and a husking-belt driven from said husking-rollers, and a slip-clutch interposed in the driving connections between the husking-rollers and the husking-belt.

3. In a device of the class described, the combination with the snapping-rolls, a shaft for driving the same, and a friction-clutch interposed between said driving-shaft and snapping-rolls; of corn-husking rollers suitably located to coöperate with said snapping-rolls and driven thereby, and a reverse release-clutch interposed between the snapping-rolls and the husking-rollers; a husking-belt and a feed-belt driven from said husking-rollers, and a slip-clutch interposed in the driving connections between the husking rollers and belts.

4. In a device of the class described, the combination with the snapping-rolls, a shaft for driving the same, and a friction-clutch interposed between said driving-shaft and snapping-rolls; of corn-husking rollers suitably located to coöperate with said snapping-rolls and driven thereby, and a reverse release-clutch interposed between the snapping-rolls and the husking-rollers; a husking-belt coöperating with the husking-rollers and driven thereby, a feed-belt for carrying the fodder to the snapping-rolls driven from the husking-belt, a shuck-conveyer and a corn-conveyer driven from the husking-rollers, and a slip-clutch interposed in the driving connections between the husking-rollers and said belts and conveyers.

5. In a device of the class described, the combination with the husking-rollers, and means for driving the same, of the husking-belt coöperating therewith, and driving connections between said husking-rollers and husking-belt including a disk and clamping mechanism for the same that will yield only to prevent breakage.

6. In a device of the class described, the combination with the husking-rollers, and means for driving the same, of the husking-belt coöperating therewith, force-feed mechanism coöperating with the husking-rollers, connections from said husking-rollers for reciprocating the force-feed mechanism, and driving connections between said husking-rollers and husking-belt including a disk and clamping mechanism for the same that will yield only to prevent breakage.

7. In a device of the class described, the combination with the husking-rollers, and means for driving the same, of the husking-belt coöperating therewith, driving connections between said husking-rollers and husking-belt including a disk and clamping mechanism for the same that will yield only to prevent breakage, force-feed mechanism for said husking-rollers, connections with the husking-belt for operating said force-feed mechanism, the shuck-conveyer and the corn-conveyer, and connections with the husking-rollers for operating said conveyers.

8. In a device of the class described, the combination with the framework having the parallel driving-shafts therein for the snapping-rolls, husking-rollers, husking-belt, shuck-conveyer, and corn-conveyer, driving connections between the snapping-rolls and the husking-roller shafts, a short counter-shaft, driving connections between the husking-roller shaft and the counter-shaft, and driving connections between the counter-shaft and the shafts for the husking-belt, shuck-conveyer and corn-conveyer, comprising three sprocket-wheels on the counter-shaft, one sprocket-wheel on each of the shafts for the husking-belt, shuck-conveyer, and corn-conveyer, and the three sprocket-chains connecting said sprocket-wheels, as described.

9. In a device of the class described, the combination with the frame, of the husking-rollers mounted to rotate therein, the husking-belt traveling above and parallel to the rollers, a single casting on each side of the frame carrying the husking-belt, and means for raising and lowering said castings.

10. In a device of the class described, the combination with the frame, of the husking-rollers mounted to rotate therein, the husking-belt traveling above and parallel to the rollers, a single casting on each side of the frame carrying the husking-belt, means for raising and lowering said castings, and gages coöperating with said castings to indicate how they are adjusted.

11. In a device of the class described, the combination with the frame, of the husking-rollers mounted to rotate therein, the husking-belt traveling above and parallel to the rollers, a single casting on each side of the frame carrying the husking-belt, means for raising and lowering said castings at each end independently, and gages for each end of each of said castings to indicate how they are adjusted.

12. In a device of the class described, the combination with the frame, of the husking-rollers mounted to rotate therein, the husking-belt traveling above and parallel to the rollers and containing the transversely-movable slats, means for raising and lowering the husking-belt, mechanism for reciprocating the slats, and means for adjusting said mechanism to raise or lower it independently of the adjustment of the husking-belt.

13. In a device of the class described, the combination with the frame, of the husking-rollers mounted to rotate therein, the husking-belt traveling above and parallel to the rollers and containing the transversely-movable slats, means for raising and lowering the husking-belt, levers for reciprocating the slats, and the adjustable bearing for the levers consisting of the slotted brackets 172 to which the castings 174 having the bearing-pins 177 for the levers are clamped.

14. In a device of the class described, the combination with the frame, of the husking-rollers mounted to rotate therein, the husking-belt traveling above and parallel to the rollers and containing the transversely-movable slats, means for raising and lowering the husking-belt, the levers for reciprocating the slats, and the adjustable bearings for the levers consisting of the slotted corrugated brackets 172 to which the corrugated castings 174 having the bearing-pins 177 for the levers are clamped.

15. In a device of the class described, the combination with the husking-rollers, of the husking-belt traveling above and parallel to the rollers and having the transversely-movable rasping-slats, and means for reciprocating said slats consisting of the crank-shafts 180 and the levers 178 reciprocated by the cranks on said shafts.

16. In a device of the class described, the combination with the husking-rollers, of the husking-belt traveling above and parallel to the rollers and having the transversely-movable rasping-slats, and means for reciprocating said slats consisting of the shaft having the gear-pinions at either end meshing with another pair of gear-pinions connected to a pair of bevel-gear pinions, the crank-shafts 180 having the bevel-gear pinions on their ends meshing with the first-mentioned bevel-gear pinions, and the slotted levers 178 reciprocated by the cranks on said shaft.

17. In a device of the class described, the combination with the husking-rollers, of the husking-belt traveling above and parallel to the rollers and having the transversely-movable rasping-slats, the castings in which the husking-belt is mounted having the bearings for the husking-belt shaft and for the transverse crank-shafts, the said transverse crank-shafts 180, and the levers 178 reciprocated by the cranks on said shafts and coöperating with the ends of the slats.

18. In a device of the class described, the combination with the snapping-rolls, of the husking-rollers located beneath them in position to receive the ears from the snapping-rolls, and the reciprocating force-feed plate extending solidly across the ends of the husking-rollers and beneath the snapping-rolls so as to insure the ears snapped off by the rolls falling onto the husking-rollers and being fed downward thereon.

19. In a device of the class described, the combination with the snapping-rolls, of the husking-rollers located beneath them in position to receive the ears from the snapping-rolls, and the reciprocating force-feed plate extending solidly across the ends of the husking-rollers and beneath the snapping-rolls so as to insure the ears snapped off by the rolls falling onto the husking-rollers and being fed downward thereon and composed of the reduced portions 110 covering the tops of the coöperating pairs of rollers and the angular portions 111 covering the space between the ends of each set of rollers.

20. In a device of the class described, the combination with the snapping-rolls, of the husking-rollers located beneath them in position to receive the ears from the snapping-rolls, and the reciprocating force-feed plate extending solidly across the ends of the husking-rollers and beneath the snapping-rolls so as to insure the ears snapped off by the rolls falling onto the husking-rollers and being fed downward thereon and composed of the reduced portions 110 covering the tops of the coöperating pairs of rollers, the angular portions 111 covering the space between the ends of each set of rollers, and the tapering blocks 114 projecting from beneath said angular portions 111.

21. In a device of the class described, the combination with the snapping-rolls, of the husking-rollers located beneath them in position to receive the ears snapped off by the rolls, and the reciprocating force-feed mechanism coöperating with said rollers and including the bars 116 and the blocks 120 thereon extending between the non-coöperating rollers.

22. In a device of the class described, the combination with the snapping-rolls, of the husking-rollers located in position to receive the ears from the snapping-rolls, and the reciprocating force-feed mechanism consisting of the plate extending solidly across the ends of the husking-rollers and beneath the snapping-rolls and composed of the reduced portions 110 covering the tops of the coöperating pairs of rollers, the angular portions 111 covering the space between the ends of each set of rollers, the tapering blocks 115 beneath the angular portions 111, and the bars 116 having the blocks 120 thereon projecting from the tapering blocks 114 substantially as shown and described.

23. In a device of the class described, the combination with the snapping-rolls, of the husking-rollers, reciprocating force-feed mechanism, and means for reciprocating the same consisting of a shaft mounted to rotate in the force-feed mechanism and provided with the gear-pinions on its ends, the rack-bars on the sides of the machine with which the pinions mesh, a crank-shaft, a link connecting the crank-shaft and the first-mentioned shaft, and means for holding the pinions in engagement with the racks.

24. In a device of the class described, the combination with the snapping-rolls, of the husking-rollers, reciprocating force-feed mechanism, and means for reciprocating the same consisting of a shaft mounted to rotate in the force-feed mechanism and provided with the gear-pinions on its ends, the rack-bars on the sides of the machine with which the pinions mesh, a crank-shaft, a link connecting the crank-shaft and the first-mentioned shaft, and means for holding the pinions in engagement with the racks consisting of the flanges on the racks and the coöperating lugs on the shaft.

25. In a device of the class described, the combination with the husking-rollers, of the husking-belt traveling above and parallel to said rollers, and provided with the rasps loosely secured thereon and movable in the direction of travel of the belt.

26. In a device of the class described, the combination with the husking-rollers, of the husking-belt traveling above and parallel to said rollers and provided with the reciprocating slats having the curved outer surfaces, and the slotted rasps having their inner ends correspondingly curved and loosely secured to said slats by pins passing through the slots therein.

27. In a device of the class described, the combination with the husking-rollers, of the husking-belt traveling above and parallel to said rollers and provided with the reciprocating bars, clips on the chains forming the husking-belt in which the bars reciprocate, and stops on said slats coöperating with the clips to limit the movement of the slats, one of the stops being yielding.

28. In a device of the class described, the combination with the husking-rollers, of the husking-belt traveling above and parallel to the rollers and provided with the reciprocating bars, clips on the chains forming the husking-belt in which the bars reciprocate, and stops on said slats coöperating with the clips to limit the movement of the slats, one of the stops being yielding and consisting of the angular spring-piece 167 having the inclined portion 168 and the shoulder 169 coöperating with the slot 166 in the slat.

29. In a device of the class described, the combination with the transverse supporting-rods 103 and 107, of the husking-roller-bearing supports mounted thereon, the husking-rollers journaled in said supports having the bevel-gears on the upper ends thereon, the shaft 45 having the bevel-gears 96 meshing with the aforesaid bevel-gears on the rollers, and the screws 121 in the lowermost roller-bearing supports coöperating with the ends of the rollers to regulate their position.

30. In a device of the class described, the combination with the snapping-rolls, of the husking-rollers located in position to receive the ears from the snapping-rolls, the reciprocating force-feed mechanism including the bars 116 having the blocks 121 thereon extending between the non-coöperating pairs of rollers, the bearings for the lower ends of said rollers, and the castings secured on the upper side of said bearings having the plates 119 thereon and the slotted arms 118 receiving the lower ends of the bars 116.

31. In a device of the class described, the combination with the husking-rolls arranged in coöperating pairs, of the bars 116 extending between said pairs and provided with the blocks 120 on the upper surface thereof, and means for reciprocating said bars; for the purpose described.

32. In a device of the class described, the combination with the husking-rolls arranged in coöperating pairs, of the bars 116 extending between said pairs and provided with the blocks 120 having upper ends beveled on the upper surface thereof, and means for reciprocating said bars; for the purpose described.

33. In a device of the class described, the combination with the driving-shaft, of the feed-rolls driven thereby, a second shaft driven by the feed-rolls, a one-way clutch interposed between the rolls and second shaft, husking-rolls driven by said second shaft, a husk-conveyer and a corn-conveyer driven by said second shaft, and a slip-clutch interposed between said second shaft and said conveyers.

34. In a device of the class described, the combination with the driving-shaft having the shredder-head secured thereon, of the snapping-rolls driven by said shaft, a hand-clutch interposed between said shaft and snapping-rolls, a shaft 45 driven by said snapping-rolls, a one-way clutch interposed between said snapping-rolls and shaft 45, husking-rolls, husk and corn conveyers and a shaft 74 all driven by the shaft 45, a slip-clutch interposed between the shaft 45 and the said conveyers and shaft 74, and a husking-belt, feed-belt, force-feed mechanism and husking-belt eccentric-shaft all driven by the shaft 74; substantially as and for the purpose described.

In testimony whereof I affix my signature in presence of two witnesses.

LOUIS HOLLAND-LETZ.

Witnesses:
 O. W. JONES,
 S. G. LLEWELLYN.